United States Patent
Dudar

(10) Patent No.: US 10,036,681 B2
(45) Date of Patent: Jul. 31, 2018

(54) METHODS AND SYSTEM FOR AN EVAPORATIVE EMISSIONS SYSTEM LEAK TEST USING AN EXTERNAL PRESSURE SOURCE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 14/799,742

(22) Filed: Jul. 15, 2015

(65) Prior Publication Data

US 2017/0016794 A1    Jan. 19, 2017

(51) Int. Cl.
G01M 3/00 (2006.01)
G01M 3/02 (2006.01)
F02M 25/08 (2006.01)

(52) U.S. Cl.
CPC ............ *G01M 3/025* (2013.01); *F02M 25/08* (2013.01)

(58) Field of Classification Search
CPC .......... G01N 3/025; G01N 3/12; F02M 25/08; G01M 3/26; G01L 27/00
USPC ..................................... 73/40.5, 40, 37, 1.57
See application file for complete search history.

(56) References Cited

U.S. PATENT DOCUMENTS

| | | | | |
|---|---|---|---|---|
| 2,095,833 | A * | 10/1937 | Rockwell | B60T 13/58 144/208.8 |
| 6,321,727 | B1 * | 11/2001 | Reddy | F02M 25/0809 123/520 |
| 6,974,251 | B2 * | 12/2005 | DeRonne | G01K 1/20 374/141 |
| 7,387,437 | B2 * | 6/2008 | Brown | G01K 1/20 374/110 |
| 8,074,627 | B2 | 12/2011 | Siddiqui | |
| 9,651,002 | B2 * | 5/2017 | Dudar | F02M 25/0809 |
| 2003/0061864 | A1 * | 4/2003 | Wong | F02M 25/0809 73/40 |
| 2006/0191330 | A1 * | 8/2006 | Hayakawa | F02M 25/0809 73/114.39 |
| 2010/0114448 | A1 * | 5/2010 | Gabor | B60T 13/46 701/79 |
| 2011/0139130 | A1 * | 6/2011 | Siddiqui | F02M 25/0818 123/520 |
| 2014/0060160 | A1 * | 3/2014 | Pursifull | F02M 25/0809 73/40 |
| 2014/0074385 | A1 * | 3/2014 | Dudar | F02M 25/0818 701/113 |
| 2014/0316638 | A1 * | 10/2014 | Dudar | F02D 29/02 701/29.4 |

(Continued)

OTHER PUBLICATIONS

Dudar, Aed M., "Evaporative Emissions Diagnostic During a Remote Start Condition," U.S. Appl. No. 15/046,984, filed Feb. 18, 2016, 61 pages.

*Primary Examiner* — Manish S Shah
*Assistant Examiner* — Nigel Plumb
(74) *Attorney, Agent, or Firm* — Julia Voutyras; McCoy Russell LLP

(57) ABSTRACT

Methods and systems are provided for conducting an evaporative emissions system leak test. In one example, at engine shut-down, pressure stored in a coolant degas bottle is applied to a fuel system in order to pressurize the system. In this way, pressure build-up in the degas bottle may be advantageously utilized to enable a leak test to be conducted.

20 Claims, 6 Drawing Sheets

(56) References Cited

U.S. PATENT DOCUMENTS

2015/0090006 A1* 4/2015 Peters ................ F02M 25/0818
  73/40.5 R
2017/0016795 A1* 1/2017 Dudar .................. G01M 3/025

* cited by examiner

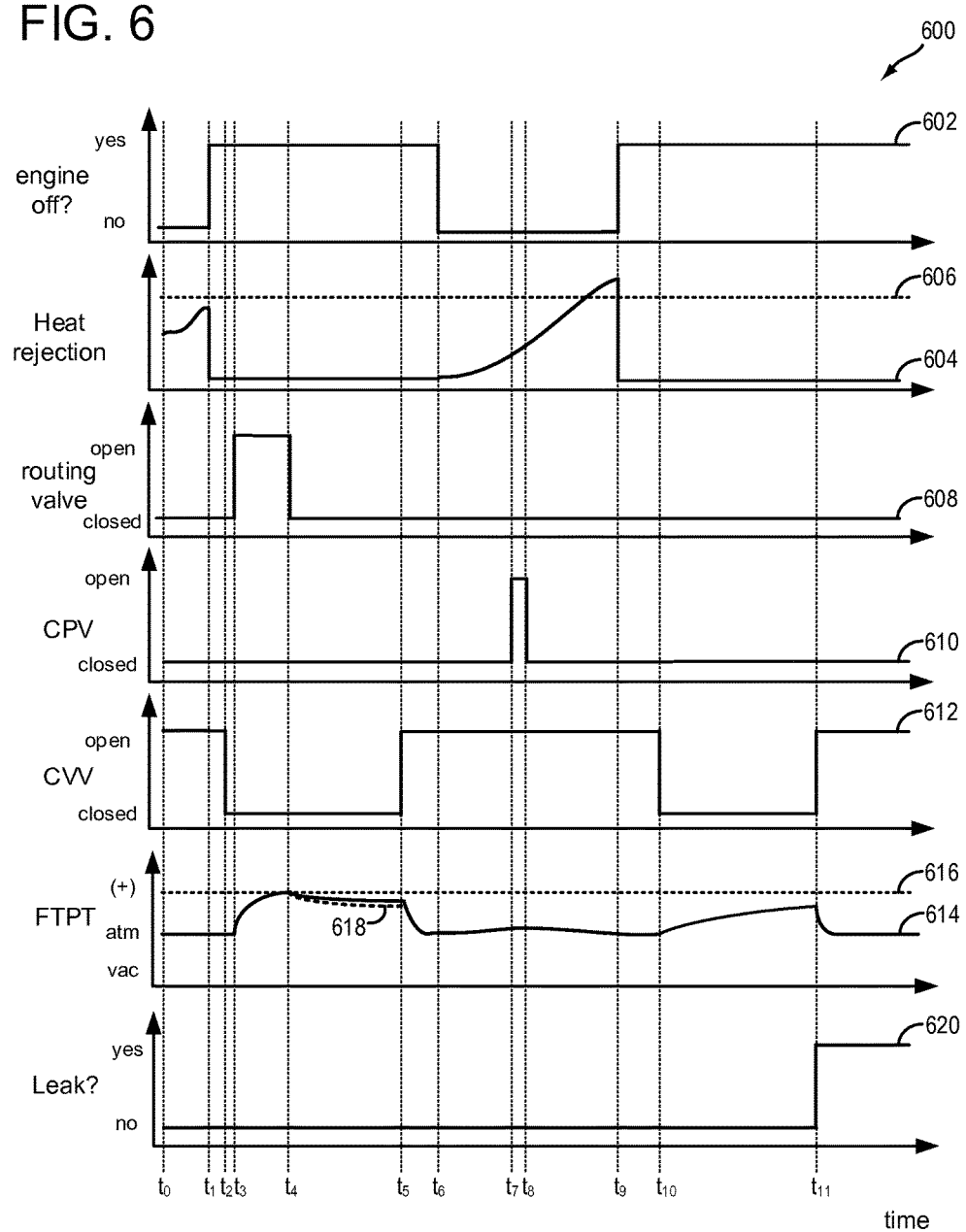

METHODS AND SYSTEM FOR AN EVAPORATIVE EMISSIONS SYSTEM LEAK TEST USING AN EXTERNAL PRESSURE SOURCE

FIELD

The present description relates generally to methods and systems for controlling a vehicle engine to actively pressurize a fuel system for conducting an evaporative emissions system leak test.

BACKGROUND/SUMMARY

Vehicle emission control systems may be configured to store fuel vapors from fuel tank refueling and diurnal engine operations, and then purge the stored vapors during a subsequent engine operation. In an effort to meet stringent federal emissions regulations, emission control systems may need to be intermittently diagnosed for the presence of leaks that could release fuel vapors to the atmosphere. Evaporative leaks may be identified using engine-off natural vacuum (EONV) during conditions when a vehicle engine is not operating. In particular, a fuel system may be isolated at an engine-off event. The pressure in such a fuel system will increase if the tank is heated further (e.g., from hot exhaust or a hot parking surface) as liquid fuel vaporizes. As a fuel tank cools down, a vacuum is generated therein as fuel vapors condense to liquid fuel. Vacuum generation is monitored and leaks identified based on expected vacuum development or expected rates of vacuum development.

In order to preserve battery charge, a typical EONV test is subject to a time limit. A failure to reach a pressure or vacuum threshold before the end of the time limit may result in degradation being indicated, even if the fuel system is intact. The pressure rise portion of the test may execute until the fuel tank pressure curve reaches a zero-slope. If the pressure rise has a relatively low rate of constant increase (e.g., due to cool ambient conditions counteracting the pressure increase), and a significant amount of the time limit elapses prior to a zero-slope moment, the subsequent vacuum test may fail based on the limited amount of time remaining, regardless of the state of the fuel system.

Further, the entry conditions and thresholds for a typical EONV test are based on an inferred total amount of heat rejected into the fuel tank during the prior drive cycle. The inferred amount of heat may be based on engine run-time, integrated mass air flow, etc. However, the timing of heat energy transfer to the fuel tank significantly effects the fuel tank temperature at the initiation of the EONV test. A period of high-speed driving followed by a period of idling would indicate a high total amount of heat rejected, but much of the heat would dissipate from the tank during the idling period.

An alternative to relying on inferred sufficient heat rejection to determine suitable conditions and thresholds for entry into a typical EONV test is to instead actively pressurize the fuel system via an external pressure source. Toward this end, US Patent Application No. 2015/0090006 A1 teaches conducting leak detection in an evaporative emission systems control system by using a pump configured to both pressurize and evacuate the fuel system. However, the inventors herein have recognized potential issues with such a method. For example, the use of an external pump introduces additional costs, occupies additional space in the vehicle, and includes the potential for malfunction.

Thus, the inventors herein have developed systems and methods to at least partially address the above issues. In one example, a method is provided comprising, at engine shutdown, applying pressure stored in a coolant system degas bottle to a fuel system. In this way, pressure build-up in a degas bottle is advantageously utilized instead of being released to the atmosphere, thus obviating the need for an onboard pump in a case where an external pressure source is desired.

In one example, the pressure from the degas bottle may be applied to the fuel system during a leak detection test in order to pressurize the fuel system. Once the fuel system is pressurized, pressure decay may be monitored, and if the pressure decay does not meet a condition relative to a threshold (e.g., if the pressure decay rate is faster than expected), a leak in the fuel system may be indicated.

As one example, pressure stored in the coolant system degas bottle may be applied to the fuel system only under conditions wherein sufficient heat rejection is not inferred from the prior drive cycle. In this way, an evaporative emissions system leak test may be enabled under conditions where the leak test may otherwise not be executed, thus increasing opportunities for evaporative emissions system leak detection and correspondingly reducing bleed emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 6 shows a timeline for an example evaporative emissions system leak testing procedure.

DETAILED DESCRIPTION

Figure 1:
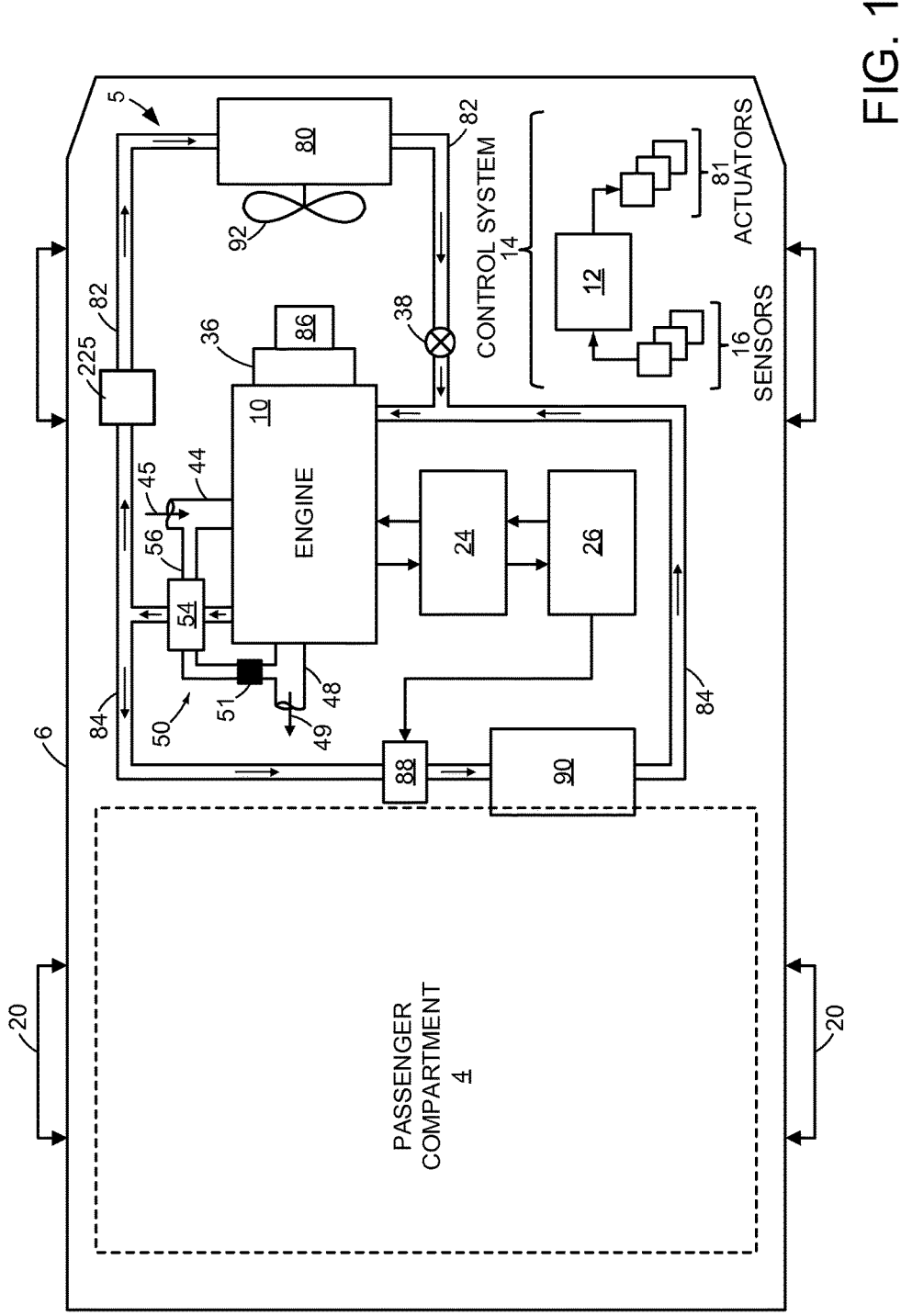
FIG. 1 schematically shows a cooling system for a vehicle.

The following detailed description relates to systems and methods for performing an evaporative emissions system leak test procedure using external pressure stored in a degas bottle. The degas bottle may be included as part of a cooling system in a vehicle, as shown in FIG. 1. Vehicles may include cooling systems configured to reduce overheating of an engine by transferring the heat to ambient air. Therein, coolant is circulated through the engine block to remove heat from the engine, the heated coolant then circulated through a radiator to dissipate the heat. The cooling system may include various components such as a coolant reservoir coupled to the system for degassing and storing coolant. A pressurized reservoir that also serves to separate entrained air from the coolant is typically called a degas bottle. When the temperature of coolant anywhere in the system rises, thermal expansion of the coolant causes pressure to rise in the degas bottle as the trapped air volume reduces. Pressure relief can be achieved by releasing air from the degas bottle through a valve that is typically mounted in the fill cap. Then, when the temperature and pressure of coolant drops below atmospheric pressure in the degas bottle, air may be drawn back into the bottle through another valve that is often mounted in the fill cap. However, simply releasing the stored pressure in the degas bottle depletes a valuable onboard pressure source that may be used, for example, to pressurize a fuel system.

Figure 2:
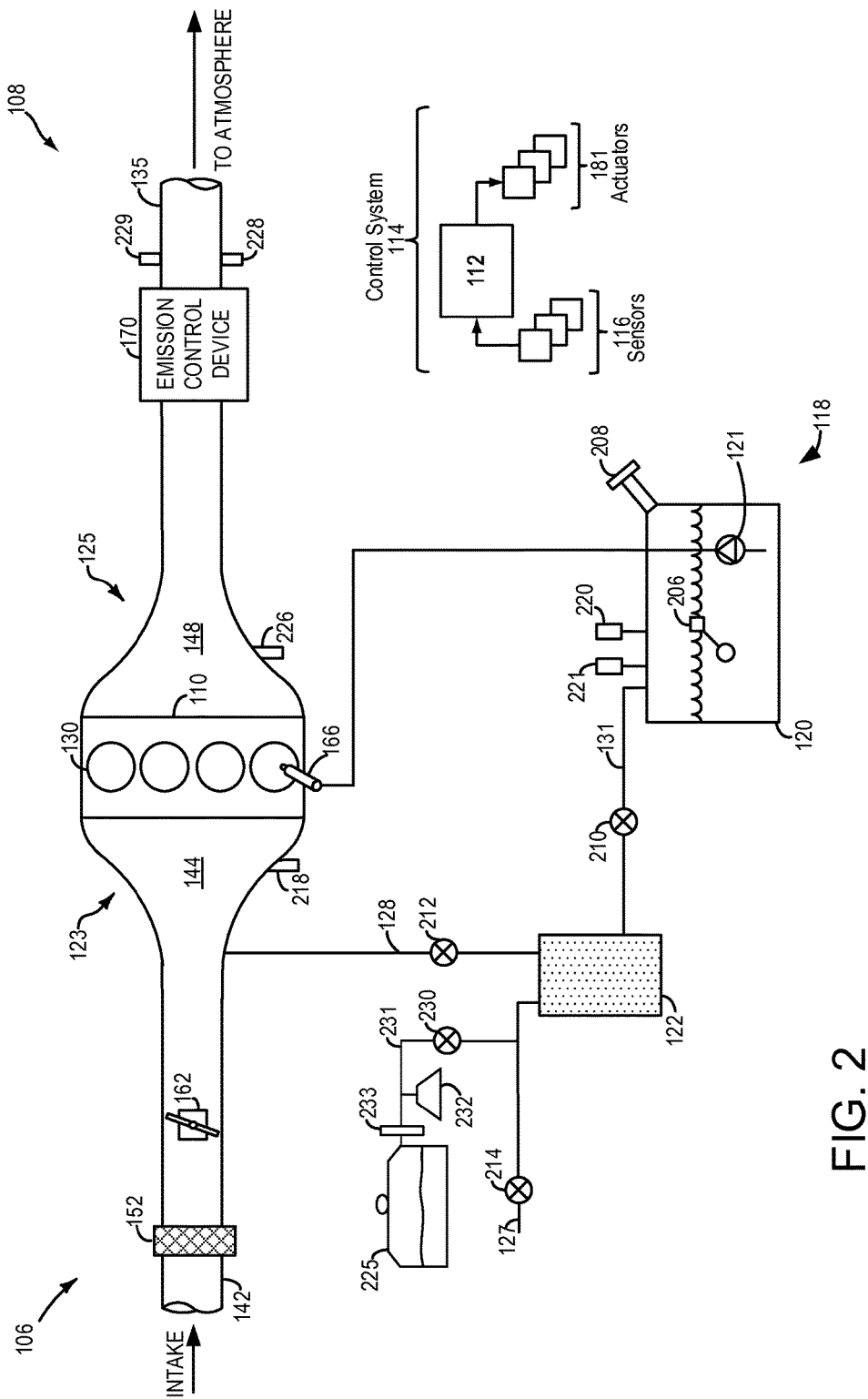
FIG. 2 schematically shows a fuel system and emissions system for a vehicle engine.
Figure 3:
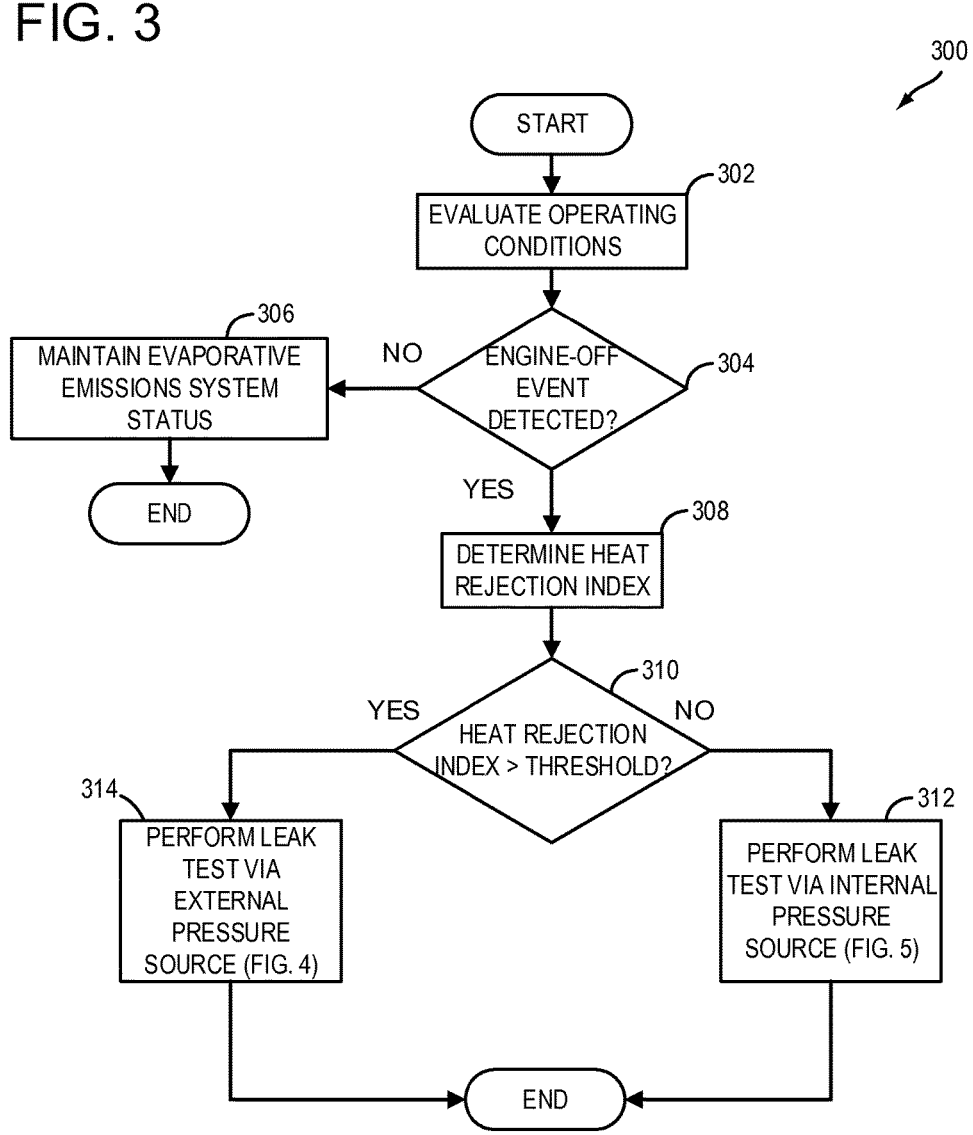
FIG. 3 shows an example high-level method for indicating whether to conduct an evaporative emissions system leak test using an external or internal pressure source.
Figure 4:
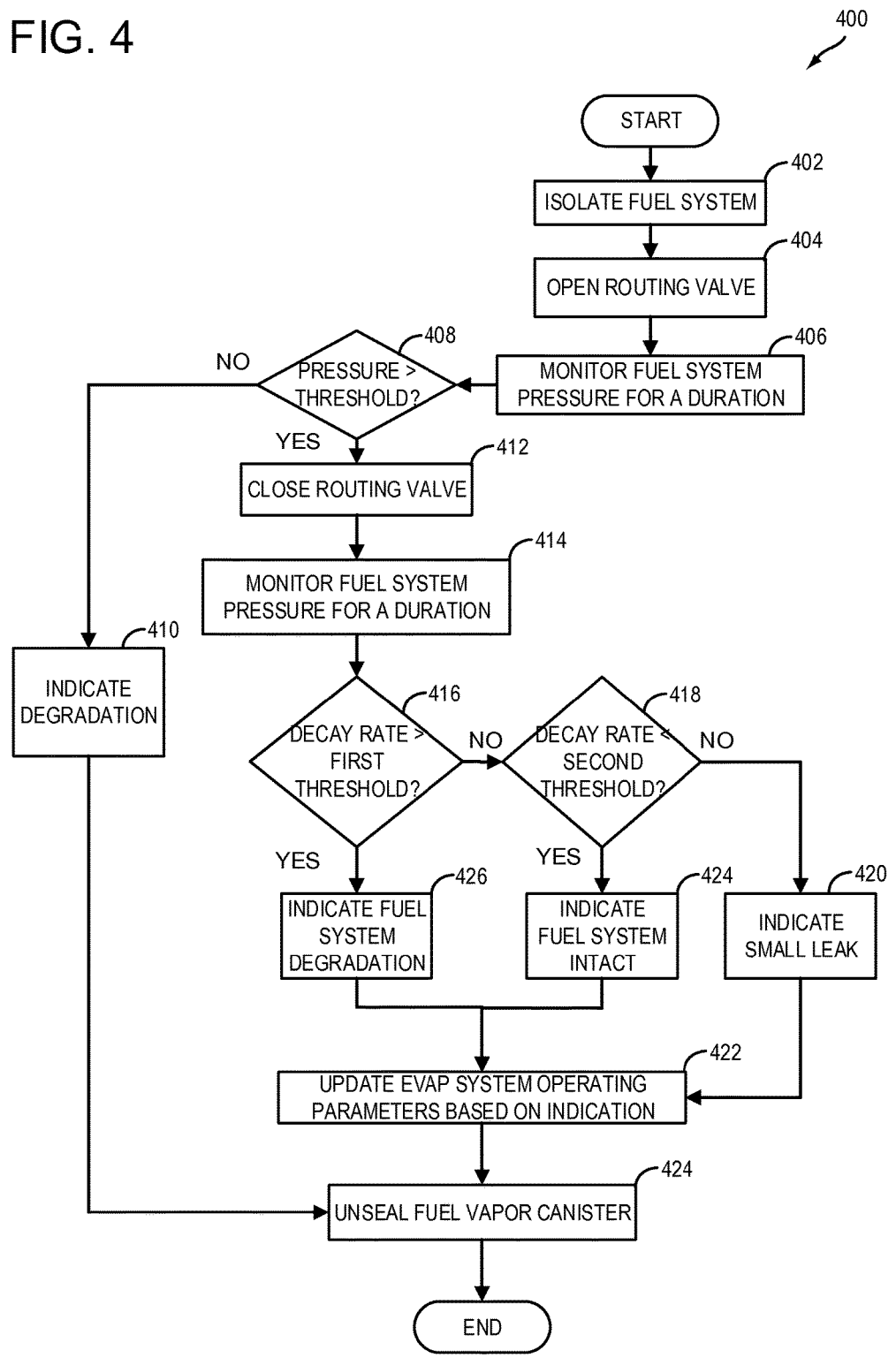
FIG. 4 shows an example method for actively performing an evaporative emissions system leak test using external pressure supplied from a degas bottle.

The vehicle may also include a fuel system including an evaporative emissions (evap) system, wherein the degas bottle is coupled to a fuel vapor canister vent line via a routing valve as shown in FIG. 2. During the course of a vehicle drive cycle, pressure builds in the degas bottle vapor space due to hot coolant. The stored pressure may be advantageously utilized to pressurize the fuel system for performing an evaporative emissions system leak test procedure. FIG. 3 depicts an example high level method for indicating whether to conduct an evaporative emissions system leak test using an external or internal pressure source. More specifically, the method determines whether sufficient heat rejection has occurred during the previous drive cycle, and if sufficient heat rejection is not detected, an evaporative emissions system leak test is conducted using external pressure supplied from the degas bottle. FIG. 4 shows in more detail the method for conducting an evaporative emissions system leak test using external pressure supplied from the degas bottle under conditions wherein sufficient heat rejection was not detected during the previous drive cycle. If sufficient heat rejection during the previous drive cycle is detected, an evaporative emissions system leak test may be performed using an internal pressure source, as described in detail in FIG. 5. An example timeline for conducting an evaporative emissions system leak test using pressure from an external or internal pressure source is depicted in FIG. 6.

FIG. 1 shows an example embodiment of a cooling system 5 in a motor vehicle 6 illustrated schematically. Cooling system 5 circulates coolant through internal combustion engine 10 and exhaust gas recirculation (EGR) cooler 54 to absorb waste heat and distributes the heated coolant to radiator 80 and/or heater core 90 via coolant lines 82 and 84, respectively.

In particular, FIG. 1 shows cooling system 5 coupled to engine 10 and circulating engine coolant from engine 10, through EGR cooler 54, and to radiator 80 via engine-driven water pump 86, and back to engine 10 via coolant line 82. Engine-driven water pump 86 may be coupled to the engine via front end accessory drive (FEAD) 36, and rotated proportionally to engine speed via belt, chain, etc. Specifically, engine-driven pump 86 circulates coolant through passages in the engine block, head, etc., to absorb engine heat, which is then transferred via the radiator 80 to ambient air. In an example where pump 86 is a centrifugal pump, the pressure (and resulting flow) produced may be proportional to the crankshaft speed, which may be directly proportional to engine speed. The temperature of the coolant may be regulated by a thermostat valve 38, located in the cooling line 82, which may be kept closed until the coolant reaches a threshold temperature.

Further, fan 92 may be coupled to radiator 80 in order to maintain an airflow through radiator 80 when vehicle 6 is moving slowly or stopped while the engine is running. In some examples, fan speed may be controlled by controller 12. Alternatively, fan 92 may be coupled to engine-driven water pump 86.

As shown in FIG. 1, engine 10 may include an exhaust gas recirculation (EGR) system 50. EGR system 50 may route a desired portion of exhaust gas from exhaust manifold 48 to intake manifold 44 via EGR passage 56. The amount of EGR provided to intake manifold 44 may be varied by controller 12 via EGR valve 51. Further, an EGR sensor (not shown) may be arranged within EGR passage 56 and may provide an indication of one or more of pressure, temperature, and concentration of the exhaust gas. Alternatively, the EGR may be controlled based on an exhaust oxygen sensor and/or and intake oxygen sensor. Under some conditions, EGR system 50 may be used to regulate the temperature of the air and fuel mixture within the combustion chamber. EGR system 50 may further include EGR cooler 54 for cooling exhaust gas 49 being reintroduced to engine 10. In such an embodiment, coolant leaving engine 10 may be circulated through EGR cooler 54 before moving through coolant line 82 to radiator 80. A degas bottle 225 may be positioned in coolant line 82 upstream of radiator 80 or other suitable position, such as downstream of radiator 80.

After passing through EGR cooler 54, coolant may flow through coolant line 82, as described above, and/or through coolant line 84 to heater core 90 where the heat may be transferred to passenger compartment 4, and the coolant flows back to engine 10. In some examples, engine-driven pump 86 may operate to circulate the coolant through both coolant lines 82 and 84. In other examples in which a vehicle has a hybrid-electric propulsion system, an electric auxiliary pump 88 may be included in the cooling system in addition to the engine-driven pump. As such, auxiliary pump 88 may be employed to circulate coolant through heater core 90 during occasions when engine 10 is off (e.g., electric only operation) and/or to assist engine-driven pump 86 when the engine is running. Like engine-driven pump 86, auxiliary pump 88 may be a centrifugal pump; however, the pressure (and resulting flow) produced by pump 88 may be proportional to an amount of power supplied to the pump by energy storage device 26.

In this example embodiment, the hybrid propulsion system includes an energy conversion device 24, which may include a motor and a generator, among others, and combinations thereof. The energy conversion device 24 is further shown coupled to an energy storage device 26, which may include a battery, a capacitor, a flywheel, a pressure vessel, etc. The energy conversion device may be operated to absorb energy from vehicle motion and/or the engine and convert the absorbed energy to an energy form suitable for storage by the energy storage device (e.g., provide a generator operation). The energy conversion device may also be operated to supply an output (power, work, torque, speed, etc.) to the drive wheels 20, engine 10 (e.g., provide a motor operation), auxiliary pump 88, etc. It should be appreciated that the energy conversion device may, in some embodiments, include only a motor, only a generator, or both a motor and generator, among various other components used for providing the appropriate conversion of energy between the energy storage device and the vehicle drive wheels and/or engine.

Hybrid-electric propulsion embodiments may include full hybrid systems, in which the vehicle can run on just the engine, just the energy conversion device (e.g., motor), or a combination of both. Assist or mild hybrid configurations may also be employed, in which the engine is the primary torque source, with the hybrid propulsion system acting to selectively deliver added torque, for example during tip-in or other conditions. Further still, starter/generator and/or smart alternator systems may also be used. Additionally, the various components described above may be controlled by vehicle controller 12. Controller 12 may comprise a portion of a control system 14. Control system 14 is shown receiving information from a plurality of sensors 16 (various examples of which are described herein) and sending control signals to a plurality of actuators 81 (various examples of which are described herein).

From the above, it should be understood that the exemplary hybrid-electric propulsion system is capable of various modes of operation. In a full hybrid implementation, for example, the propulsion system may operate using energy conversion device 24 (e.g., an electric motor) as the only torque source propelling the vehicle. This "electric only" mode of operation may be employed during braking, low speeds, while stopped at traffic lights, etc. In another mode, engine 10 is turned on, and acts as the only torque source powering drive wheel 20. In still another mode, which may be referred to as an "assist" mode, the hybrid propulsion system may supplement and act in cooperation with the torque provided by engine 10. As indicated above, energy conversion device 24 may also operate in a generator mode, in which torque is absorbed from engine 10 and/or the transmission. Furthermore, energy conversion device 24 may act to augment or absorb torque during transitions of engine 10 between different combustion modes (e.g., during transitions between a spark ignition mode and a compression ignition mode).

It is to be understood that the hybrid vehicle configuration described above is exemplary and other vehicle configurations are within the scope of this disclosure. For example, the vehicle system may be a non-hybrid system where power for propulsion is only derived from the engine and not from an energy conversion device.

FIG. 2 shows a schematic depiction of a hybrid vehicle system 106 that can derive propulsion power from engine system 108 and/or an on-board energy storage device, such as a battery system. An energy conversion device, such as the energy conversion device shown in FIG. 1, may be operated to absorb energy from vehicle motion and/or engine operation, and then convert the absorbed energy to an energy form suitable for storage by the energy storage device. Hybrid vehicle system 106 may be one non-limiting example of motor vehicle 6 of FIG. 1.

Engine system 108 may include an engine 110 having a plurality of cylinders 130. Engine 110 is one non-limiting example of engine 10 of FIG. 1. Engine 110 includes an engine intake 123 and an engine exhaust 125. Engine intake 123 includes an air intake throttle 162 fluidly coupled to the engine intake manifold 144 via an intake passage 142. Air may enter intake passage 142 via air filter 152. Engine exhaust 125 includes an exhaust manifold 148 leading to an exhaust passage 135 that routes exhaust gas to the atmosphere. Engine exhaust 125 may include one or more emission control devices 170 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 108 is a boosted engine system, the engine system may further include a boosting device, such as a turbocharger (not shown).

Engine system 108 is coupled to a fuel system 118. Fuel system 118 includes a fuel tank 120 coupled to a fuel pump 121 and a fuel vapor canister 122. During a fuel tank refueling event, fuel may be pumped into the vehicle from an external source through refueling port 208. Fuel tank 120 may hold a plurality of fuel blends, including fuel with a range of alcohol concentrations, such as various gasoline-ethanol blends, including E10, E85, gasoline, etc., and combinations thereof. A fuel level sensor 206 located in fuel tank 120 may provide an indication of the fuel level ("Fuel Level Input") to controller 112. As depicted, fuel level sensor 206 may comprise a float connected to a variable resistor. Alternatively, other types of fuel level sensors may be used.

Fuel pump 121 is configured to pressurize fuel delivered to the injectors of engine 110, such as example injector 166. While only a single injector 166 is shown, additional injectors are provided for each cylinder. It will be appreciated that fuel system 118 may be a return-less fuel system, a return fuel system, or various other types of fuel system. Vapors generated in fuel tank 120 may be routed to fuel vapor canister 122, via conduit 131, before being purged to the engine intake 123.

Fuel vapor canister 122 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 122 may be purged to engine intake 123 by opening canister purge valve 212. While a single canister 122 is shown, it will be appreciated that fuel system 118 may include any number of canisters. In one example, canister purge valve 212 may be a solenoid valve wherein opening or closing of the valve is performed via actuation of a canister purge solenoid.

Canister 122 includes a vent 127 for routing gases out of the canister 122 to the atmosphere when storing, or trapping, fuel vapors from fuel tank 120. Vent 127 may also allow fresh air to be drawn into fuel vapor canister 122 when purging stored fuel vapors to engine intake 123 via purge line 128 and purge valve 212. While this example shows vent 127 communicating with fresh, unheated air, various modifications may also be used. Vent 127 may include a canister vent valve 214 to adjust a flow of air and vapors between canister 122 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 214 may be a solenoid valve wherein opening or closing of the valve is performed via actuation of a canister vent solenoid. In particular, the canister vent valve may be a normally open valve that is closed upon actuation of the canister vent solenoid.

As such, hybrid vehicle system 106 may have reduced engine operation times due to the vehicle being powered by engine system 108 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 210 may be optionally included in conduit 131 such that fuel tank 120 is coupled to canister 122 via the valve. During regular engine operation, isolation valve 210 may be kept closed to limit the amount of diurnal or "running loss" vapors directed to canister 122 from fuel tank 120. During refueling operations, and selected purging conditions, isolation valve 210 may be temporarily opened, e.g., for a duration, to direct fuel vapors from the fuel tank 120 to canister 122. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 210 positioned along conduit 131, in alternate embodiments, the isolation valve may be mounted on fuel tank 120.

One or more pressure sensors 220 may be coupled to fuel system 118 for providing an estimate of a fuel system pressure. In one example, the fuel system pressure is a fuel tank pressure, wherein pressure sensor 220 is a fuel tank pressure sensor coupled to fuel tank 120 for estimating a fuel tank pressure or vacuum level. While the depicted example shows pressure sensor 220 directly coupled to fuel tank 120, in alternate embodiments, the pressure sensor may be coupled between the fuel tank and canister 122, specifically between the fuel tank and isolation valve 210. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system leak based on changes in a fuel tank pressure during a leak diagnostic routine.

One or more temperature sensors 221 may also be coupled to fuel system 118 for providing an estimate of a fuel system temperature. In one example, the fuel system temperature is a fuel tank temperature, wherein temperature sensor 221 is a fuel tank temperature sensor coupled to fuel tank 120 for estimating a fuel tank temperature. While the depicted example shows temperature sensor 221 directly coupled to fuel tank 120, in alternate embodiments, the temperature sensor may be coupled between the fuel tank and canister 122.

Fuel vapors released from canister 122, for example during a purging operation, may be directed into engine intake manifold 144 via purge line 128. The flow of vapors along purge line 128 may be regulated by canister purge valve 212, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 112, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 128 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 218 coupled to intake manifold 144, and communicated with controller 112. Alternatively, MAP may be inferred from alternate engine operating conditions, such as mass air flow (MAF), as measured by a MAF sensor (not shown) coupled to the intake manifold.

Fuel system 118 may be operated by controller 112 in a plurality of modes by selective adjustment of the various valves and solenoids. For example, the fuel system may be operated in a fuel vapor storage mode (e.g., during a fuel tank refueling operation and with the engine not running), wherein the controller 112 may open isolation valve 210 and canister vent valve 214 while closing canister purge valve (CPV) 212 to direct refueling vapors into canister 122 while preventing fuel vapors from being directed into the intake manifold.

As another example, the fuel system may be operated in a refueling mode (e.g., when fuel tank refueling is requested by a vehicle operator), wherein the controller 112 may open isolation valve 210 and canister vent valve 214, while maintaining canister purge valve 212 closed, to depressurize the fuel tank before allowing enabling fuel to be added therein. As such, isolation valve 210 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 112 may open canister purge valve 212 and canister vent valve while closing isolation valve 210. Herein, the vacuum generated by the intake manifold of the operating engine may be used to draw fresh air through vent 127 and through fuel vapor canister 122 to purge the stored fuel vapors into intake manifold 144. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 122 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Vehicle system 106 may further include control system 114. Control system 114 is one non-limiting example of control system 14 of FIG. 1. Control system 114 is shown receiving information from a plurality of sensors 116 (various examples of which are described herein) and sending control signals to a plurality of actuators 181 (various examples of which are described herein). As one example, sensors 116 may include exhaust gas sensor 226 located upstream of the emission control device, temperature sensor 228, MAP sensor 218, pressure sensor 220, and pressure sensor 229. Other sensors such as additional pressure, temperature, air/fuel ratio, and composition sensors may be coupled to various locations in the vehicle system 106. As another example, the actuators may include fuel injector 166, isolation valve 210, purge valve 212, vent valve 214, fuel pump 121, and throttle 162.

Control system 114 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 114 may further be configured to receive information via the internet or other communication networks. Information received from the GPS may be cross-referenced to information available via the internet to determine local weather conditions, local vehicle regulations, etc. Control system 114 may use the internet to obtain updated software modules which may be stored in non-transitory memory.

The control system 114 may include a controller 112. Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

Vehicle system 106 may further include degas bottle 225. Degas bottle 225 may be coupled to a vehicle cooling system, such as cooling system 5 in FIG. 1, and comprise a pressurized reservoir serving to separate entrained air from the coolant. When the temperature of coolant in the coolant system rises, pressure may rise in the degas bottle 225. In one example, degas bottle 225 may be coupled to canister vent line 127 via degas routing line 231. Vapor flow between degas bottle 225 and the canister vent line 127 may be controlled by a routing valve 230. Further, degas routing line 231 may include filter 233 for preventing the flow of debris from degas bottle 225 to canister vent line 127, and a liquid fluid trap 232, designed to trap residual liquid escaping the degas bottle 225, thus preventing coolant from entering the fuel system via canister vent line 127.

Pressure in degas bottle 225 may thus be routed to the fuel system 118 by commanding open routing valve 230. A position of the routing valve 230 may be adjusted (e.g., an opening degree of the valve adjusted) by movement of an actuator coupled to the routing valve. The actuator may move in response to a signal received from the controller, for example. The actuator may be a hydraulic, electric, and/or pneumatic actuator. In this way, the fuel system 118 may be pressurized in order to conduct an evaporative emissions system leak test, as described further in regard to the methods presented in FIGS. 3-5. The controller 12 and/or 112 receives signals from the various sensors of FIGS. 1 and/or 2 and employs the various actuators of FIGS. 1 and/or 2 to adjust engine operation based on the received signals and instructions stored on a memory of the controller.

A flow chart for a high-level example method 300 for performing an evaporative emissions system leak test is shown in FIG. 3. More specifically, method 300 includes determining a heat rejection index following an engine-off event, and if the determined heat rejection index is above a threshold, proceeding with leak detection via engine-off natural vacuum (EONV), and if fuel tank temperature is less than a threshold, performing leak detection by pressurizing the fuel system using an external pressure source. Method 300 will be described with reference to the systems described herein and shown in FIGS. 1-2, though it should be understood that similar methods may be applied to other systems without departing from the scope of this disclosure. Method 300 may be carried out by a controller, such as controller 12 in FIG. 1, and may be stored at the controller as executable instructions in non-transitory memory. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

Method 300 begins at 302 and includes evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. At 304, method 300 includes determining whether an engine-off condition is detected. An engine-off condition may be indicated by a key-off event, a user setting a vehicle alarm following exiting a vehicle that has been parked, a user depressing a button, an automatic engine shutdown, or other suitable indicator. In some examples, certain vehicle-on, engine-off conditions, such as those which may occur in a hybrid vehicle operating in battery-only mode, may be sufficient to proceed with an evaporative emissions system leak test. If an engine-off condition is not detected, method 300 proceeds to 306. At 306, method 300 includes maintaining evaporative emissions system status. For example, a canister vent valve (CVV), fuel tank isolation valve (FTIV), canister purge valve (CPV), etc., may be maintained in their current status. Method 300 may then end.

If a vehicle-off event is detected at 304, method 300 proceeds to 308 and includes determining a heat rejection index for the previous drive cycle. In some examples, the heat rejection index may be based on a drive cycle aggressiveness index. The drive cycle aggressiveness index may be based on an amount of heat rejected by the engine during the previous drive cycle, the timing of the heat rejected, the length of time spent at differing levels of drive aggressiveness, ambient conditions, etc. The heat rejected by the engine may be based on one or more of engine load, fuel injection amounts summed over time, intake manifold air mass summed over time, fuel tank temperature, and/or exhaust temperature at the vehicle off event. In some examples, a heat rejection index of zero indicates that no heat will be rejected to the fuel tank, and may indicate that no combustion occurred prior to determining the heat rejection index, for example.

Following a determination of a heat rejection index at 308, method 300 proceeds to 310 and determines whether the index is greater than a threshold. The threshold index may be predetermined (e.g., 1.5) or may be based on operating and/or ambient conditions. The threshold may be set at a value indicative that an EONV test is likely (e.g., above a threshold likelihood) to run to completion and provide an accurate pass/fail result. If the determined heat rejection index is greater than a threshold, method 300 proceeds to 312 where an evaporative emissions leak test is conducted via an internal pressure source, e.g., derived from heat rejection, also referred to as engine-off natural vacuum, as described further in FIG. 5. Method 300 may then end. Alternatively, if at 310 the determined heat rejection index is less than a threshold, method 300 proceeds to 314 wherein the leak test is conducted using a pressure source external to the evaporative emissions system, as further described in FIG. 4. Method 300 may then end.

Turning to FIG. 4, a flow chart for an example method 400 for conducting an evaporative emissions system leak test using pressure from an external source is shown. More specifically, method 400 may be used to conduct an evaporative emissions system leak test under conditions where the leak test may otherwise not be executed, such as when the heat rejection index is below a threshold. In this way, method 400 may increase opportunities for evaporative emission system leak detection and thus result in a reduction in bleed emissions. Method 400 will be described with reference to the systems described herein and shown in FIGS. 1-2, and with reference to the methods described herein and shown in FIGS. 3 and 5, though it should be understood that similar methods may be applied to other systems without departing from the scope of this disclosure. Method 400 may be carried out by a controller holding executable instructions in non-transitory memory, such as controller 12 in FIG. 1.

Method 400 continues from method 300 wherein it was determined that the heat rejection index was below a threshold value, thus prompting the controller to proceed with method 400 in which an evaporative emissions system leak test is to be conducted using an external pressure source. Accordingly, method 400 begins at 402 and includes isolating the fuel system from atmosphere. Isolating the fuel system at 402 includes closing a canister vent valve (CVV). Additionally or alternatively, a fuel tank isolation valve (FTIV) may be closed where included in the fuel system. In this way, the fuel tank may be isolated from atmosphere. The status of a canister purge valve (CPV) and/or other valves coupled within a conduit connecting the fuel tank to atmosphere may also be assessed and closed if open. Method 400 then proceeds to 404.

At 404, method 400 includes opening a routing valve positioned in a vapor line fluidically coupling the degas bottle to the fuel system, with the vapor line fluidically coupled to a canister vent line of the fuel system and with the canister vent line coupling a fuel vapor canister to atmosphere. In this way, by opening the routing valve with the fuel system otherwise sealed, pressure from the degas bottle may be used to pressurize the fuel system.

At 406, method 400 includes monitoring the fuel system pressure for a duration. Fuel system pressure may be monitored, for example, by a fuel tank pressure sensor, such as fuel tank pressure sensor 220, as shown in FIG. 2. In one example, the duration of time in which fuel system pressure is monitored may be a predetermined time. Continuing at 408, method 400 includes determining whether the fuel system pressure as a result of pressurizing the fuel system via the pressure stored in the degas bottle is above a threshold. The threshold value may be defined, for example, by a reference pressure obtained under control conditions in the absence of fuel system leak or degradation, and in the absence of degas bottle and degas bottle vapor line leak or degradation. If at 408, method 400 indicates that the fuel system pressure is not above a threshold, method 400 proceeds to 410 where it is indicated that degradation is present. Failure to pressurize the fuel system above a threshold may indicate degradation of the fuel system (e.g., a gross leak in the fuel system), degas bottle leak, and/or leak in the vapor line connecting the degas bottle to the fuel system. At 410, indicating degradation may include alerting the vehicle operator of the need to have the vehicle serviced in order to diagnose the cause of the failure to pressurize the fuel system using external pressure supplied from the degas bottle or other default action. In one example, a subsequent engine start may be prevented to avoid leaking fuel to atmosphere. Continuing at 424, method 400 includes unsealing the fuel system by opening the CVV and, if included, opening an FTIV. Method 400 may then end.

Returning to 408, if it is determined that fuel system pressure is greater than a threshold, method 400 proceeds to 412 where the routing valve connecting the degas bottle to the fuel system is commanded closed. Commanding the routing valve closed while maintaining the CPV and the CVV closed seals the externally pressurized fuel system. Continuing at 414, method 400 includes monitoring fuel system pressure for a duration. Fuel system pressure may be monitored, for example, by a fuel tank pressure sensor, such as fuel tank pressure sensor 220, as shown in FIG. 2. In one example the duration of time in which fuel system pressure is monitored may be a predetermined time.

Continuing at 416, method 400 includes determining whether the pressure decay rate is greater than or equal to a first threshold decay rate. The threshold decay rate may be defined, for example, by a reference pressure decay rate obtained under control conditions in which leak orifice size is known. In one example, the threshold pressure decay rate may indicate an expected pressure decay rate in the presence of a 0.02" leak in the fuel system. If at 416, the monitored pressure decay rate is greater than or equal to the first threshold, method 400 proceeds to 426 where fuel system degradation is indicated. For example, fuel system degradation at 426 may indicate the presence of fuel system leak greater than or equal to 0.02".

Continuing at 422, method 400 includes updating evaporative emission system operating parameters as a result of fuel system degradation indicated at 426. Updating evaporative emission system operating parameters at 422 may include adjusting a fuel tank venting parameter, maintaining a canister vent valve closed under some conditions, updating a canister purge schedule, updating an evaporative emissions leak test schedule, etc. Additionally, updating evaporative emission system operating parameters at 422 may include indicating the need for additional diagnostic tests to isolate the source of the detected leak, notifying an operator of the leak, and/or setting a diagnostic code. Continuing at 424, method 400 includes unsealing the fuel system by opening the CVV and, if included, opening an FTIV. Method 400 may then end.

Returning to 416, if the pressure decay rate is less than a first threshold pressure decay rate, method 400 proceeds to 418 where it is determined whether the pressure decay rate is less than or equal to a second threshold pressure decay rate. The second threshold decay rate may be defined, for example, by a reference pressure decay rate obtained under control conditions in which there is no leak in the fuel system. If at 416, the monitored pressure decay rate is less than or equal to the second threshold, method 300 proceeds to 424 where it is indicated that the fuel system is intact.

Continuing at 422, method 400 includes updating evaporative emission system operating parameters as a result of the indication that the fuel system is intact. Updating evaporative emission system operating parameters at 422 may include updating a canister purge schedule and updating an evaporative emissions leak test schedule, for example. Continuing at 424, method 400 includes unsealing the fuel system by opening the CVV and, if included, opening an FTIV. Method 400 may then end.

Returning to 418, if the pressure decay rate is not less than or equal to the second threshold pressure decay rate, method 400 proceeds to 420. At 420, it is determined that the pressure decay rate is greater than the second threshold pressure decay rate, but less than the first threshold pressure decay rate. As such, the presence of a small leak may be indicated. A small leak may be defined, for example, as a leak less than 0.02".

Continuing at 422, method 400 includes updating evaporative emission system operating parameters as a result of the indication that a small leak less than 0.02" is present in the fuel system. Updating evaporative emission system operating parameters at 422 may include updating a canister purge schedule, updating an evaporative emissions leak test schedule, etc. Additionally, updating evaporative emission system operating parameters at 422 may include indicating the need for additional diagnostic tests to isolate the source of the detected leak, and/or indicating the need for continued close monitoring of fuel system integrity. Continuing at 424, method 400 includes unsealing the fuel system by opening the CVV and, if included, opening an FTIV. Method 400 may then end.

Figure 5:
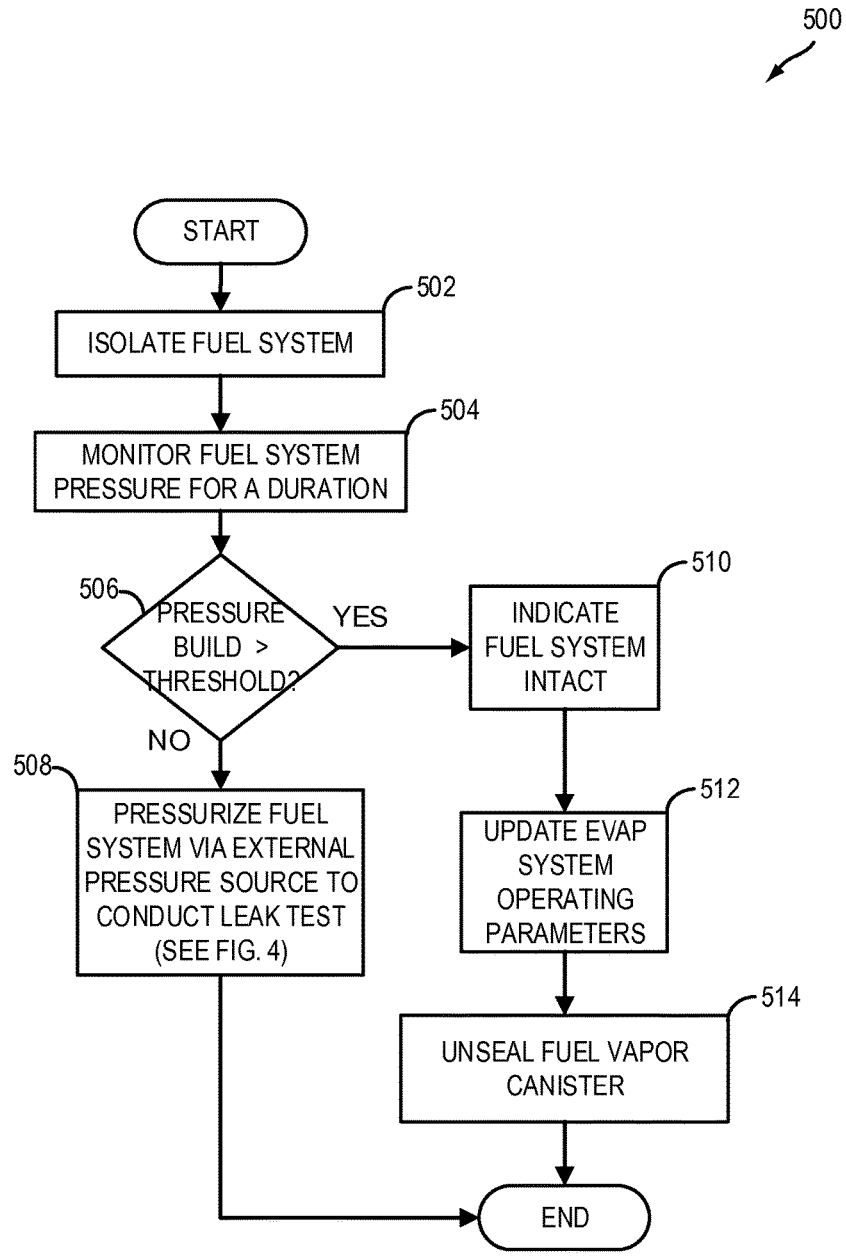
FIG. 5 shows an example method for performing an evaporative emissions system leak test using an internal pressure source provided by sufficient heat rejection.

Turning to FIG. 5, a flow chart for a high level example method 500 for conducting an evaporative emissions system leak test using an internal pressure source is shown. More specifically, method 500 may be used to conduct an evaporative emissions system leak test under conditions where sufficient heat rejection is available. If the pressure phase of the leak test stalls out, rather than venting the fuel system and resealing for a vacuum phase, method 500 includes avoiding the opportunistic vacuum phase and instead pressurizing the fuel system using external pressure as described in FIG. 4. In this way, method 500 may enable evaporative emission system leak detection using internal pressurization under conditions where results are likely to be robust. Method 500 will be described with reference to the systems described herein and shown in FIGS. 1-2, and with reference to the methods described herein and shown in FIGS. 3-4, though it should be understood that similar methods may be applied to other systems without departing from the scope of this disclosure. Method 500 may be carried out by a controller holding executable instructions in non-transitory memory, such as controller 12 in FIG. 1.

Method 500 continues from method 300 wherein it was determined that the heat rejection index was above a threshold value, thus prompting the controller to proceed with method 500 in which an evaporative emissions system leak test is to be conducted using an internal pressure source. Accordingly, method 500 begins at 502 and includes isolating the fuel system. Isolating the fuel system at 502 includes closing a canister vent valve (CVV). Additionally or alternatively, a fuel tank isolation valve (FTIV) may be closed where included in the fuel system. In this way, the fuel tank may be isolated from atmosphere. The status of a canister purge valve (CPV) and/or other valves coupled within a conduit connecting the fuel tank to atmosphere may also be assessed and closed if open. Method 500 then proceeds to 504.

At 504, method 500 includes monitoring the fuel system pressure for a duration. Fuel system pressure may be monitored, for example, by a fuel tank pressure sensor, such as fuel tank pressure sensor 220, as shown in FIG. 2. In one example the duration of time in which fuel system pressure is monitored may be a predetermined time. Continuing at 506, method 500 includes determining whether an increase in fuel system pressure (also referred to as the fuel system pressure build) is greater than or equal to a threshold pressure. The threshold pressure value may be defined, for example, by a reference pressure obtained under control conditions in the absence of fuel system leak or, in another example, by a reference pressure obtained under control conditions in the presence of a fuel system leak orifice size less than 0.02". If at 506, method 500 indicates that the fuel system pressure build is greater than or equal to the threshold pressure, method 500 proceeds to 508 where it is indicated to pressurize the fuel system via an external pressure source according to method 400 in order to conduct the leak test, as described in detail in FIG. 4. Method 500 may then end.

Returning to 506, if the pressure build is greater than or equal to the threshold, method 500 proceeds to 510 where it is indicated that the fuel system is intact. Continuing at 512, method 500 includes updating evaporative emission system operating parameters as a result of the indication that the fuel system is intact. Updating evaporative emission system operating parameters at 512 may include updating a canister purge schedule and updating an evaporative emissions leak test schedule, for example. Continuing at 514, method 500 includes unsealing the fuel system by opening the CVV and, if included, opening an FTIV. Method 500 may then end.

FIG. 6 shows an example timeline 600 for conducting an evaporative emissions leak test using internal or external pressure sources according to the methods described herein and with reference to FIGS. 3-5, and as applied to the systems described herein and with reference to FIGS. 1-2. Timeline 600 includes plot 602, indicating whether an engine-off condition is detected over time. Timeline 600 further includes plot 604, indicating a drive cycle heat rejection index over time. Line 606 represents a threshold for the heat rejection index. Timeline 600 further includes plot 608, indicating a routing valve status over time, plot 610, indicating a canister purge valve status over time, and plot 612, indicating a canister vent valve status over time. Timeline 600 further includes plot 614, indicating fuel tank pressure over time. Line 616 represents a threshold fuel tank pressure. Line 618 represents a threshold pressure decay rate. Timeline 620 further includes plot 620, indicating whether a fuel system leak is detected, over time.

At time $t_0$, the vehicle is in operation as indicated by plot 602. The routing valve, indicated by plot 608, and the canister purge valve, indicated by plot 610, are closed. The canister vent valve, indicated by plot 612, is open. Fuel tank pressure, indicated by plot 614 is at atmosphere, and no leak is indicated, represented by plot 620.

Between time $t_0$ and $t_1$, while the vehicle is in operation, heat rejection rises, indicated by plot 604. At time $t_1$, an engine off event is detected. However, heat rejection remains below a threshold, indicated by line 606. Accordingly, external pressure may be utilized in order to pressurize the fuel system for conducting an evaporative emissions leak test.

At time $t_2$, the canister vent valve is closed. As the canister purge valve is also closed, the fuel system is sealed from atmosphere. At time $t_3$ the routing valve is opened to allow pressure stored in the degas bottle to pressurize the fuel system in order to conduct an evaporative emissions system leak test. Accordingly, between time $t_3$ and $t_4$, fuel system pressure rises, and reaches a threshold pressure at time $t_4$. The threshold pressure, indicated by line 616, is the pressure build required for conducting the evaporative emissions system leak test using bleed-down analysis. As the fuel system pressure has reached threshold at time $t_4$, the routing valve is commanded closed, thus sealing the fuel system.

Between time $t_4$ and $t_5$, fuel system pressure is monitored, and the decay rate is less than a threshold decay rate, indicated by line 618. As the decay rate is less than the threshold decay rate, no leak is indicated.

At time $t_5$, the fuel system has passed the evaporative emissions system leak test, and accordingly, the fuel system is unsealed by commanding open the canister vent valve. Fuel system pressure thus decays to atmosphere.

At time $t_6$, the vehicle resumes operation. Between time $t_6$ and $t_7$, heat rejection increases, the result of vehicle operation. At time $t_7$ a canister purge is initiated. Accordingly, the canister purge valve is commanded open for the duration between time $t_7$ and $t_8$. At time $t_8$ the canister purge valve is closed, thus commencing the canister purge cycle.

Between time $t_8$ and $t_9$ heat rejection continues to rise, crossing a threshold indicated by line 606. At time $t_9$, an engine-off event is detected. As heat rejection is above a threshold value, an evaporative emissions system leak test may be conducted using an internal pressure source. Accordingly, at time $t_{10}$ the canister vent valve is commanded closed and the fuel system pressure begins to rise. Between time $t_{10}$ and time $t_{11}$ fuel system pressure rises, yet does not reach the threshold pressure, as indicated by line 616. Accordingly, at time $t_{11}$ the canister vent valve is commanded open to unseal the fuel system, and a fuel system leak is indicated. As a leak has been indicated resulting from a pressure build below a threshold using internal pressure to pressurize the fuel system, the fuel system may be further tested by pressurizing the system via external pressure provided from the degas bottle, as described.

In this way, pressure stored in a degas bottle may be advantageously utilized to pressurize a fuel system in order to conduct an evaporative emissions system leak test. As such, a leak test may be conducted under conditions which may prevent a typical engine off natural vacuum leak test procedure. Further, the pressure from the degas bottle may push hydrocarbons in the fuel vapor canister deeper into the canister, preventing or delaying bleed of the hydrocarbons near the coupling of the canister to the vent line. As such, the routing valve may be opened during conditions other than a leak test to prevent venting of hydrocarbons to atmosphere. Such conditions may include when a load on the fuel vapor canister is estimated to be above a threshold (e.g., when the canister is at storage capacity), when a sensor in the vent line (such as a hydrocarbon sensor) detects bleed of emissions from the canister, or other conditions. Because opening of the routing valve may increase fuel tank pressure (particularly in fuel systems that do not include a fuel tank isolation valve), such purposeful introduction of pressure from the degas bottle may be performed only during conditions of relatively low fuel tank pressure, for example, to prevent degradation to the fuel system.

The technical effect of conducting an evaporative emissions system leak test using the method described herein is to enable execution of a fuel system leak test more frequently, thereby making it more likely that a completion frequency requirement may be met.

The systems described herein and with reference to FIGS. 1 and 2, along with the methods described herein and with reference to FIGS. 3-5 may enable one or more systems and one or more methods. In one example, a method for an engine comprises at engine shut-down, applying pressure stored in a coolant system degas bottle to a fuel system. In a first example of the method, the method includes indicating whether a heat rejection index is below a threshold, and wherein applying pressure stored in the coolant system degas bottle to the fuel system comprises only applying pressure stored in a coolant system degas bottle to the fuel system when the heat rejection index is below the threshold. A second example of the method optionally includes the first example and further includes indicating whether the heat rejection index is below a threshold is based on one or more of fuel level, ambient temperature, sum of air mass into the engine, and drive time. A third example of the method optionally includes one or more of the first and second examples and further includes wherein applying pressure stored in the coolant system degas bottle to the fuel system comprises commanding open a routing valve positioned in a vapor line fluidically coupling the degas bottle to the fuel system, the vapor line fluidically coupled to a canister vent line of the fuel system, the canister vent line coupling a fuel vapor canister to atmosphere. A fourth example of the method optionally includes any one or more or each of the first through third examples and further includes wherein applying pressure stored in the coolant system degas bottle to the fuel system includes commanding or maintaining closed a canister vent valve and a canister purge valve. A fifth example of the method optionally includes any one or more or each of the first through fourth examples and further includes, after opening the routing valve, sealing the fuel system by commanding closed the routing valve when fuel system pressure crosses a threshold. A sixth example of the method optionally includes any one or more or each of the first through fifth examples and further includes, once the fuel system pressure crosses the threshold, maintaining the routing valve closed and monitoring pressure bleed-down in the fuel system; indicating a leak in the fuel system responsive to a pressure bleed-down rate greater than a first threshold bleed-down rate; and indicating no leak in the fuel system responsive to a pressure bleed-down rate less than a second threshold bleed-down rate.

Another example of method for a fuel system comprises responsive to a first condition, isolating the fuel system from atmosphere and indicating a leak in the fuel system based on a pressure build-up in the fuel system, where the pressure in fuel system builds due to heat rejection from one or more of an engine and ambient; and responsive to a second condition, pressurizing the fuel system via pressure stored in a coolant degas bottle and indicating a leak in the fuel system based on a pressure bleed-down in the fuel system. In a first example of the method, the method includes wherein the first condition comprises an engine-off event with a determined heat rejection index above a threshold, and wherein the second condition comprises an engine-off event with a determined heat rejection index below the threshold. A second example of the method optionally includes the first example and further includes wherein the first condition comprises an engine-off event, and wherein the second condition comprises the pressure build-up during the first condition not reaching a threshold pressure. A third example of the method optionally includes one or more of the first and second examples and further includes wherein pressurizing the fuel system via pressure stored in the coolant degas bottle includes: commanding open a routing valve coupling the coolant degas bottle to the fuel system, and commanding closed or maintaining closed a canister purge valve and a canister vent valve. A fourth example of the method optionally includes one or more or each of the first through third examples and further includes wherein pressurizing the fuel system via pressure stored in the coolant degas bottle includes pressurizing the fuel system via pressure stored in a coolant degas bottle until a threshold pressure is reached. A fifth example of the method optionally includes one or more or each of the first through fourth examples and further includes responsive to reaching the threshold pressure, sealing the fuel system by commanding closed the routing valve; and maintaining closed the canister purge valve and the canister vent valve. A sixth example of the method optionally includes one or more or each of the first through fifth examples and further includes wherein isolating the fuel system from atmosphere responsive to the first condition includes sealing the fuel system by commanding or maintaining closed a canister vent valve and a canister purge valve. A seventh example of the method optionally includes one or more or each of the first through sixth examples and further includes responsive to indicating a leak in the fuel system, adjusting one or more engine operating parameters.

An example of a system for an engine comprises a fuel system including a fuel vapor canister coupled to an engine intake via a canister purge valve and additionally coupled to a fuel tank, the fuel system further including and a canister vent line coupled between the fuel vapor canister and atmosphere and controlled via a canister vent valve; and a coolant degas bottle coupled to a cooling system configured to route coolant to the engine, and additionally coupled to the fuel system via a routing valve positioned in a vapor line fluidically coupling the degas bottle to the canister vent line of the fuel system. In a first example, the system further comprises a controller storing instructions in non-transitory memory that, when executed, cause the controller to: responsive to an engine-off condition with a heat rejection index above a threshold: isolate the fuel system from atmosphere by closing the canister vent valve and canister purge valve; and indicate a fuel system leak responsive to a pressure build-up rate in the fuel system below a threshold pressure build-up rate. A second example of the system optionally includes the first example and further includes wherein the controller includes further instructions that, when executed, cause the controller to, responsive to an engine-off condition with a heat rejection index below the threshold: isolate the fuel system from atmosphere by closing the canister vent valve and canister purge valve; pressurize the fuel system by opening the routing valve; and upon reaching a threshold pressure level in the fuel system, close the routing valve; and indicate a fuel system leak responsive to a pressure decay rate in the fuel system greater than a threshold pressure decay rate. A third example of the system optionally includes one or more of the first and second examples and further includes wherein, the controller further holds instructions stored in non-transitory memory, that when executed, cause the controller to, during conditions of vapor canister purging: command or maintain open the canister purge valve and the canister vent valve; and command or maintain closed the routing valve. A fourth example of the system optionally includes one or more or each of the first through third examples and further includes a filter membrane positioned between the coolant degas bottle and the routing valve; and a liquid trap positioned between the filter membrane and the routing valve.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
at engine shut-down, applying pressure stored in a coolant system degas bottle, coupled to an engine cooling system and to a fuel system via a vapor line, to the fuel system including a fuel vapor canister coupled to an engine intake and a fuel tank; and
indicating a leak in the fuel system responsive to a pressure measured by a pressure sensor.

2. The method of claim 1, further comprising:
indicating whether a heat rejection index is below a threshold, and wherein applying pressure stored in the coolant system degas bottle to the fuel system comprises only applying pressure stored in the coolant system degas bottle to the fuel system when the heat rejection index is below the threshold.

3. The method of claim 2, wherein indicating whether the heat rejection index is below the threshold is based on one or more of fuel level, ambient temperature, sum of air mass into the engine, and drive time.

4. The method of claim 1, wherein applying pressure stored in the coolant system degas bottle to the fuel system comprises commanding open a routing valve positioned in the vapor line, the vapor line fluidically coupled to a canister vent line of the fuel system, the canister vent line coupling the fuel vapor canister to atmosphere.

5. The method of claim 4, wherein applying pressure stored in the coolant system degas bottle to the fuel system includes commanding or maintaining closed a canister vent valve and a canister purge valve.

6. The method of claim 4, further comprising, after opening the routing valve, sealing the fuel system by commanding closed the routing valve when fuel system pressure crosses a threshold.

7. The method of claim 6, further comprising:
once the fuel system pressure crosses the threshold, maintaining the routing valve closed and measuring a pressure bleed-down rate in the fuel system with the pressure sensor;
wherein indicating the leak in the fuel system responsive to the pressure measured by the pressure sensor comprises indicating a leak in the fuel system responsive to a pressure bleed-down rate greater than a first threshold bleed-down rate; and
indicating no leak in the fuel system responsive to a pressure bleed-down rate less than a second threshold bleed-down rate.

8. A method for a fuel system comprising:
responsive to a first condition, isolating the fuel system from atmosphere and indicating a leak in the fuel system based on a pressure build-up in the fuel system, where pressure in the fuel system builds due to heat rejection from one or more of an engine and ambient and the pressure build-up is measured by a pressure sensor; and
responsive to a second condition, pressurizing the fuel system via pressure stored in a coolant system degas bottle and indicating a leak in the fuel system based on a pressure bleed-down in the fuel system as measured by the pressure sensor, the coolant system degas bottle coupled to a cooling system configured to route coolant to the engine, and additionally coupled to the fuel system via a vapor line fluidically coupling the coolant system degas bottle to a canister vent line of the fuel system.

9. The method of claim 8, wherein the first condition comprises an engine-off event with a determined heat rejection index above a threshold, and wherein the second condition comprises an engine-off event with a determined heat rejection index below the threshold.

10. The method of claim 8, wherein the first condition comprises an engine-off event, and wherein the second condition comprises the pressure build-up during the first condition not reaching a threshold pressure.

11. The method of claim 8, wherein pressurizing the fuel system via pressure stored in the coolant system degas bottle includes:
commanding open a routing valve positioned in the vapor line coupling the coolant system degas bottle to the fuel system; and
commanding closed or maintaining closed a canister purge valve and a canister vent valve.

12. The method of claim 11, wherein pressurizing the fuel system via pressure stored in the coolant system degas bottle includes pressurizing the fuel system via pressure stored in the coolant system degas bottle until a threshold pressure is reached.

13. The method of claim 12, further comprising, responsive to reaching the threshold pressure, sealing the fuel system by commanding closed the routing valve and maintaining closed the canister purge valve and the canister vent valve.

14. The method of claim 8, wherein isolating the fuel system from atmosphere responsive to the first condition includes sealing the fuel system by commanding or maintaining closed a canister vent valve and a canister purge valve.

15. The method of claim 8, further comprising, responsive to indicating a leak in the fuel system, adjusting one or more engine operating parameters.

16. A system for an engine comprising:
a fuel system including a fuel vapor canister coupled to an engine intake via a canister purge valve and additionally coupled to a fuel tank, the fuel system further including a canister vent line coupled between the fuel vapor canister and atmosphere and controlled via a canister vent valve; and
a coolant system degas bottle coupled to a cooling system configured to route coolant to the engine, and additionally coupled to the fuel system via a routing valve positioned in a vapor line fluidically coupling the coolant system degas bottle to the canister vent line of the fuel system.

17. The system of claim 16, further comprising:
a controller storing instructions in non-transitory memory that, when executed, cause the controller to:
responsive to an engine-off condition with a heat rejection index above a threshold:
isolate the fuel system from atmosphere by closing the canister vent valve and the canister purge valve; and
indicate a fuel system leak responsive to a pressure build-up rate in the fuel system below a threshold pressure build-up rate.

18. The system of claim 17, wherein the controller includes further instructions that, when executed, cause the controller to, responsive to an engine-off condition with a heat rejection index below the threshold:
isolate the fuel system from atmosphere by closing the canister vent valve and the canister purge valve;
pressurize the fuel system by opening the routing valve;
upon reaching a threshold pressure level in the fuel system, close the routing valve; and
indicate a fuel system leak responsive to a pressure decay rate in the fuel system greater than a threshold pressure decay rate.

19. The system of claim 17, wherein the controller further holds instructions stored in non-transitory memory that, when executed, cause the controller to, during conditions of vapor canister purging:
command or maintain open the canister purge valve and the canister vent valve; and
command or maintain closed the routing valve.

20. The system of claim 16, further comprising:
a filter membrane positioned between the coolant system degas bottle and the routing valve; and
a liquid trap positioned between the filter membrane and the routing valve.

* * * * *